(12) United States Patent
Lowery et al.

(10) Patent No.: US 8,655,177 B2
(45) Date of Patent: Feb. 18, 2014

(54) OPTICAL TRANSMITTER

(75) Inventors: Arthur James Lowery, Kew (AU); Liang Bangyuan Du, Clayton (AU)

(73) Assignee: Ofidium Pty. Ltd., Melbourne, Victoria (AU)

( * ) Notice: Subject to any disclaimer, the term of this patent is extended or adjusted under 35 U.S.C. 154(b) by 95 days.

(21) Appl. No.: 13/123,007

(22) PCT Filed: Feb. 27, 2009

(86) PCT No.: PCT/AU2009/000227
§ 371 (c)(1),
(2), (4) Date: Jul. 7, 2011

(87) PCT Pub. No.: WO2010/040169
PCT Pub. Date: Apr. 15, 2010

(65) Prior Publication Data
US 2011/0286747 A1    Nov. 24, 2011

(30) Foreign Application Priority Data
Oct. 7, 2008 (AU) ................................. 2008905195

(51) Int. Cl.
*H04B 10/00* (2013.01)
(52) U.S. Cl.
USPC ........................... 398/115; 398/182; 398/186
(58) Field of Classification Search
USPC ................................................ 398/115–117
See application file for complete search history.

(56) References Cited

U.S. PATENT DOCUMENTS

| | | | |
|---|---|---|---|
| 5,717,708 A * | 2/1998 | Mells | 372/32 |
| 2002/0181052 A1 | 12/2002 | Butman et al. | |
| 2007/0140703 A1* | 6/2007 | Fells | 398/159 |
| 2009/0052556 A1* | 2/2009 | Fernandez | 375/241 |

FOREIGN PATENT DOCUMENTS

| | | |
|---|---|---|
| WO | WO 2007/041799 | 4/2007 |
| WO | WO 2007041799 A2 * | 4/2007 |
| WO | WO 2008/078147 | 7/2008 |
| WO | WO 2009/049364 | 4/2009 |
| WO | WO 2010/040169 | 4/2010 |

* cited by examiner

*Primary Examiner* — Nathan Curs
*Assistant Examiner* — David Lambert
(74) *Attorney, Agent, or Firm* — BakerHostetler

(57) ABSTRACT

A method of generating an information-bearing optical signal (614) from input digital information (602) includes generating (604, 606) an information-bearing electrical signal comprising an in-phase (I) component and a quadrature (Q) component. Each of the components has a predetermined baseband bandwidth requirement (B). The I and Q signal components are combined (610) with corresponding I and Q components of a radio frequency (RF) carrier (608). The carrier has a central frequency greater than the signal bandwidth requirement (B). An optical source is modulated (612) with the combined I and Q signal and carrier components, in order to produce a modulated optical signal (614) which comprises an optical carrier corresponding with the RF carrier, and substantially only a single information-bearing optical sideband in an optical frequency domain, corresponding with the information-bearing electrical signals. Transmitters implementing the method are also disclosed.

15 Claims, 5 Drawing Sheets

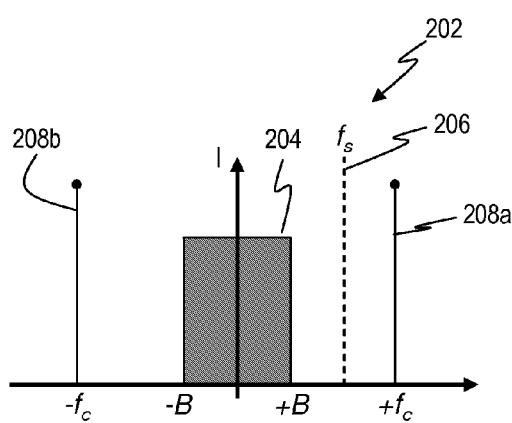
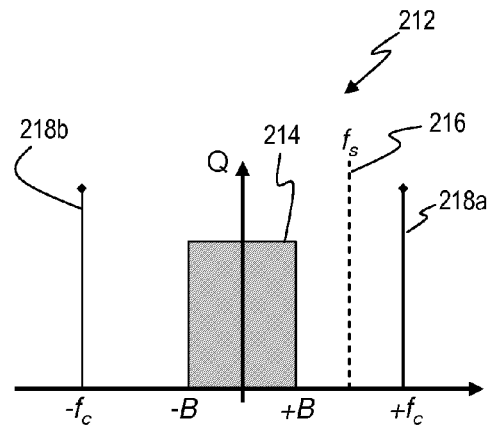
Figure 2(a)  Figure 2(b)
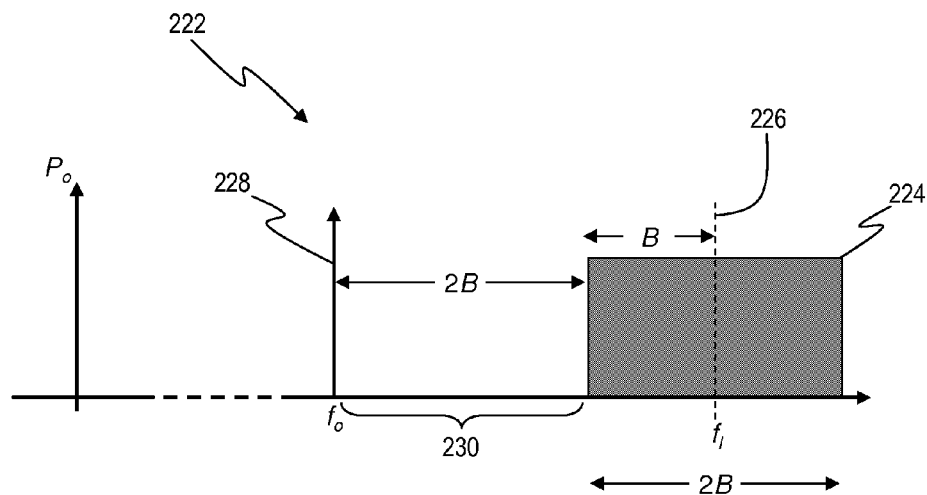
Figure 2(c)

OPTICAL TRANSMITTER

CROSS-REFERENCE TO RELATED APPLICATIONS

This application is the National Stage of International Application No. PCT/AU2009/000227, filed Feb. 27, 2009, which claims the benefit of Australian Application No. 2008905195, filed Oct. 7, 2008, the disclosures of which are incorporated herein by reference in their entireties.

FIELD OF THE INVENTION

The present invention relates generally to optical communications, and more particularly to improved apparatus and methods for generating information signals for transmission over optical channels, such as one or more spans of optical fibre.

BACKGROUND OF THE INVENTION

There is presently considerable interest in the use of electrical domain techniques for compensation or equalisation of various sources of signal degradation in optical transmission systems, including chromatic dispersion, nonlinear propagation effects, and polarisation mode dispersion (PMD). In particular, the preservation of full amplitude and phase information in the conversion of electrical signals into corresponding optical signals at the transmitter, and in the corresponding optical-to-electrical conversion at the receiver, facilitates the use of a range of electrical signal processing techniques for equalisation and recovery of transmitted information signals. For example, the preservation of phase information enables the use of orthogonal frequency division multiplexing (OFDM) for coding and equalisation of information signals transmitted over optical channels.

Preservation of phase information is readily achieved through the use of coherent optical technologies. Coherent optical heterodyne receivers, for example, utilise a local optical oscillator, ie a suitable laser located at the receiver, having a frequency almost equal to that of the optical signal to be detected. The output field from the local laser is combined with the received signal field, and the combined signal directed to an optical-to-electrical converter, such as a photodiode. The process of so-called "square-law detection" occurring at the photodiode (ie conversion of optical intensity into electrical current or voltage) causes mixing between the local oscillator field and the received signal field, whereby the optical signal is converted into an equivalent electrical signal within the radio frequency (RF) domain. However, coherent optical heterodyne receivers are generally considered to have a number of practical disadvantages, particularly in terms of cost and complexity, which preclude their widespread deployment in optical communications systems. In particular, coherent receivers require a local oscillator (as previously noted), as well as polarisation stabilisation and frequency/phase locking of the optical local oscillator.

It is therefore desirable to avoid the need to employ coherent heterodyne receivers within optical communications systems. In particular, direct detection receivers, which require only a photodiode and associated electronics, are far simpler, less costly, more robust, and importantly are wavelength independent. In order to enable direct detection receivers to be used, it is desirable to transmit a suitable optical carrier along with the optical signal band. It is further desirable that the transmitted optical carrier and optical signal band are derived from a single optical source in order to avoid excessive phase noise in the received electrical signal which may result from finite laser linewidth. A further desirable characteristic of the transmitted optical signal is that it has a spectrum which is structured so as to avoid, or at least minimise, degradation of the received electrical signal which may result from mixing between signal components during the process of square-law detection. Additionally, it is desirable to maximise the utilisation of available bandwidth in the electrical domain, and of the associated signal processing capacity, in order to increase the available information capacity of the system reduce power consumption, reduce cost, minimise complexity, and so forth. A number of these desirable features result in conflicting design constraints, requiring trade-offs or compromises to be made in the implementation of suitable optical transmitters.

Accordingly, there is need for alternative and/or improved apparatus and methods for generating optical signals that are able to provide better overall performance in view of the various competing requirements and constraints.

SUMMARY OF THE INVENTION

In one aspect, the present invention provides a method of generating an information-bearing optical signal, including the steps of:

generating an information-bearing electrical signal comprising an in-phase (I) component and a quadrature (Q) component, each said component having a predetermined baseband bandwidth requirement (B);

combining said I- and Q-signal components with corresponding I and Q components of a radio frequency (RF) carrier, said carrier having a central frequency greater than said signal bandwidth requirement (B); and modulating an optical source with the combined I- and Q-signal and carrier components so as to produce a modulated optical signal comprising an optical carrier corresponding with said RF carrier, and substantially only a single information-bearing optical sideband in an optical frequency domain, corresponding with said information-bearing electrical signals.

Advantageously, embodiments of the inventive method enable all of the signal processing (whether analog and/or digital) required to generate the electrical signal components to fully utilise a range of baseband frequencies within the bandwidth B for the encoding of information, thereby maximising the utilisation of available electrical bandwidth, and signal processing capacity. The resulting information-bearing optical sideband, which results from the combination of both I- and Q-signal components, has a corresponding fully utilised bandwidth of twice the electrical baseband bandwidth (ie 2B). The spacing, in the optical frequency domain, between the information-bearing optical sideband and the optical carrier, which preferably includes a guard band for mitigating intermodulation interference arising in a direct detection optical receiver, is determined by the central frequency of the RF carrier. In an embodiment of an optical transmitter implementing the inventive method, only those circuit elements concerned with combining the signal and RF carrier components, and modulating the optical source with the resulting combined signal, are required to operate at frequencies up to the RF carrier frequency.

In preferred embodiments, the step of generating the information-bearing electrical signal may comprise producing real-valued digital signals (ie sequences of digital samples) corresponding with the I- and Q-signal components, and converting the digital signals into corresponding analog electrical waveforms. In such embodiments, the sample rate ($f_s$) of the digital signals may be as low as 2B, ie equal to the minimum bandwidth of the information-bearing optical sideband. This may be compared with prior art methods in which signal processing techniques are used to incorporate unused frequency components within the information signal band in order to mitigate intermodulation interference in a direct detection optical receiver, and which accordingly requires operation at a sampling rate of at least twice the present minimum rate (ie of at least 4B).

Accordingly, embodiments of the present invention enable given digital signal processing (DSP) and digital-to-analog conversion (DAC) technology to generate signals bearing at least twice the total information content, as compared with prior art approaches.

Advantageously, the RF carrier has a central frequency that is greater than or equal to 3B. In this case, a frequency guard band is provided between the optical carrier and the information-bearing optical sideband of the modulated optical signal that is greater than or equal to the optical sideband bandwidth (2B), whereby all intermodulation interference components generated in a direct detection receiver will fall outside the bandwidth of the information-bearing signal components.

Preferably, the step of modulating the optical source includes applying the combined I- and Q-signal and carrier components to an optical modulator which is configured to modulate the optical source so as to produce the modulated optical signal comprising the optical carrier and the information-bearing optical sideband. In a particularly preferred embodiment, the modulator is a complex optical modulator having an optical input port, to which an unmodulated optical source is applied, and at least two electrical input ports to which said combined I- and Q-signal and carrier components are respectively applied, the modulator further having an optical output at which the modulated optical signal is provided.

In a particularly advantageous embodiment, the information-bearing electrical signal is generated in accordance with orthogonal frequency division multiplexing (OFDM) methods, which enables precise control of mapping of digital information content onto closely-spaced subcarriers within the frequency domain, and subsequent electrical equalisation of the received signal in order to mitigate various sources of degradation in transmission, including chromatic dispersion, nonlinear propagation effects, and polarisation mode dispersion.

In another aspect, the present invention provides an optical transmitter which includes:

an electrical signal generator configured to generate an information-bearing electrical signal comprising an in-phase (I) component and a quadrature (Q) component, each said component having a predetermined baseband bandwidth requirement (B);

an electrical carrier generator configured to generate a radio frequency (RF) carrier having a central frequency greater than said signal bandwidth requirement (B);

electrical combiners for combining said I- and Q-signal components with corresponding I and Q components of the RF carrier;

an optical source; and an optical modulator configured to modulate the optical source so as to produce a modulated optical signal comprising an optical carrier corresponding with the RF carrier, and substantially only a single information-bearing optical sideband in an optical frequency domain, corresponding with said information-bearing electrical signal.

Preferably, the I and Q RF carrier components are generated from a single RF carrier source, such as an RF oscillator, by dividing the output of the RF carrier source into two components, and applying a phase shift of 90 degrees to one component relative to the other. It will be appreciated, however, that various other techniques are available for generating suitable I and Q RF carrier components, such as differentiating a first carrier (I) component in order to produce a corresponding (Q) component, or utilising two phase-locked oscillators to produce the I and Q carrier components.

Preferably, the electrical signal generator includes digital processing elements configured to produce real-valued digital signals corresponding with the I- and Q-signal components, and digital-to-analog converters (DACs) for converting said digital signals into corresponding analog electrical waveforms. The digital processing elements may comprise a digital signal processor (DSP) executing appropriate stored program instructions, and/or digital integrated circuits configured to perform some or all of the desired digital processing.

The electrical combiners may be, for example, simple resistive power combiners, or suitable multiplexing filters. Advantageously, more complex RF components, such as high frequency mixers, are not required in embodiments of the present invention, because only a simple additive combination of the RF carrier and information-bearing signal components is required, without any associated frequency shifting (ie modulation) of the information signal band.

In a particularly preferred embodiment, digital processing elements (such as a suitably programmed DSP) process complex-valued signal samples having corresponding real and imaginary components, the real components being applied to a first DAC to produce the I-signal component, and the imaginary components being applied to a second DAC to produce the Q-signal component.

The optical modulator is preferably a complex optical modulator having an optical input port, to which the optical source is applied, and at least two electrical inputs to which the combined I- and Q-signal and carrier components are respectively applied, the modulator further having an optical output at which the modulated optical signal is provided.

In yet another aspect, the present invention provides an optical transmitter which includes:

means for generating an information-bearing electrical signal comprising an in-phase (I) component and a quadrature (Q) component, each said component having a predetermined baseband bandwidth requirement (B);

means for generating I- and Q-carrier components of a radio frequency (RF) carrier having a central frequency greater than said signal bandwidth requirement (B);

an optical source; and means for modulating the optical source with said I-signal, I-carrier, Q-signal and Q-carrier components so as to produce a modulated optical signal comprising an optical carrier corresponding with the RF carrier, and substantially only a single information-bearing optical sideband in an optical frequency domain, corresponding with said information-bearing electrical signal.

In a preferred embodiment, the modulating means includes electrical combiners for combining said I- and Q-signal components with the corresponding I- and Q-carrier components, and an optical modulator configured to modulate the optical source with the combined I- and Q-signal and carrier components. Alternatively, a multi-electrode modulator may be used, having separate inputs and/or electrodes for each one of said I- and Q-carrier components, and said I- and Q-signal components, whereby the optical source is modulated with a suitable combination of the I- and Q-signal and carrier components.

Further preferred features and advantages of the invention will be apparent to those skilled in the art from the following description of preferred embodiments of the invention, which should not be considered to be limiting of the scope of the invention as defined in the preceding statements, or in the claims appended hereto.

BRIEF DESCRIPTION OF THE DRAWINGS

Preferred embodiments of the invention are described with reference to the accompanying drawings, in which:

FIG. 2 shows schematic illustrations of electrical and optical signal spectra according to an embodiment of the invention;

DETAILED DESCRIPTION OF PREFERRED EMBODIMENTS

Figure 1:
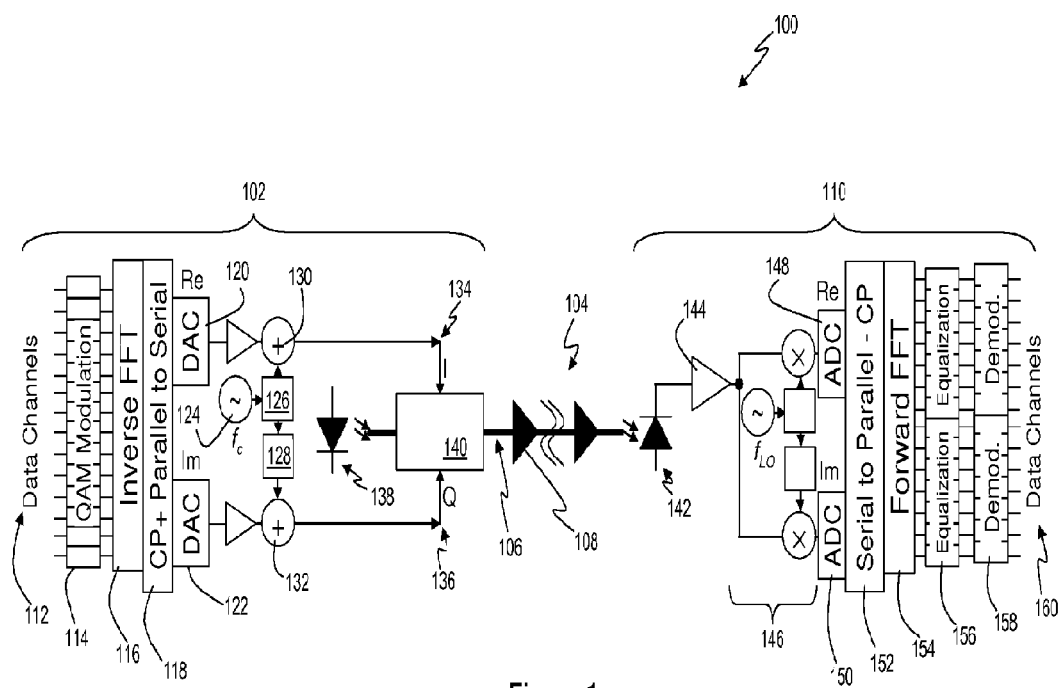
FIG. 1 is a block diagram illustrating schematically a system for communicating digital information over an optical channel, which includes a transmitter according to an embodiment of the invention.

FIG. 1 shows schematically a system 100 for communicating digital information over an optical channel, according to an embodiment of the present invention. More particularly, the exemplary system 100 includes a transmitter 102 for generating an optical signal bearing digital information for transmission over an amplified single-mode optical fibre span 104. The transmission span 104 includes a plurality of individual single-mode fibre sections, eg 106, with loss-compensating amplifiers, eg 108, inserted therebetween to overcome losses in signal power resulting from the attenuation of the single-mode fibre links 104.

The system 100 also includes a direct detection (DD) receiver 110, for receiving the digital information transmitted by the transmitter 102 over the fibre span 104.

Digital information for transmission over the fibre span 104 is input to the transmitter 102 via a parallel input port 112. The exemplary transmitter 102 is configured to generate an optical signal encoded in accordance with orthogonal frequency division multiplexing (OFDM) methods, however it will be appreciated that other forms of signal coding and/or modulation may be utilised in alternative embodiments of the invention. The transmitter 102 includes mapping units 114, which generate a corresponding plurality of data symbols, each of which is generally a complex value encoding one or more of the input information bits applied to parallel input 112. In the embodiment shown, a QAM mapping is used by the mapping units 114 to encode the input data bits and provide corresponding encoded data symbol values. Each data symbol value is a complex number representing the amplitude and phase modulation to be applied to a corresponding frequency carrier of the transmitted OFDM signal.

The QAM symbols are applied as inputs to an inverse Fast-Fourier Transform (IFFT) 116. Each input to the IFFT 116 represents the magnitude and phase of a corresponding discrete frequency component, and the transformed outputs of the IFFT 116 represent a corresponding time sequence of complex values. In a further digital processing stage 118, the time series is augmented with a cyclic prefix (CP), which allows for spreading of the OFDM symbol sequence in transmission, due to fibre dispersion. The further processing stage 118 also converts the parallel output of the IFFT 116 into a corresponding serial time sequence.

The serial time sequence consists of a series of complex number values having a sampling rate ($f_s$) which depends upon the information data rate applied to the parallel input 112, the processing performed in the signal processing elements 114, 116 and 118, and the desired electrical bandwidth of the resulting OFDM signal. Each complex signal sample represents an instantaneous magnitude and phase of a waveform in which is encoded the input digital information. As a practical matter it is necessary to convert the complex sequence into a corresponding real-valued signal (eg voltage or current), which may be used to modulate an optical source for transmission over the fibre link 104.

Accordingly, the real and imaginary components of each complex value are converted into corresponding electrical waveforms using a pair of digital-to-analog converters (DACs) 120, 122. The output of the "real" converter 120 represents an in-phase component of the desired transmitted signal, while the output of the "imaginary" converter 122 represents a quadrature component.

The transmitter 102 further includes a radio frequency (RF) carrier generator, in the form of an electrical oscillator 124 having a central frequency $f_c$. The output of the oscillator 124 is input to a power splitter 126, one output of which is input to a delay, or phase shift, 128. The purpose of the delay 128 is to introduce a shift of 90 degrees in the phase of the resulting output RF wave, relative to the non-delayed carrier wave, as measured at the inputs to the optical modulator 140 (the function of which is discussed in greater detail below).

It may be advantageous to lock the frequency $f_c$ of the RF carrier with the frequency of a clock (not shown) used to synchronise the digital processing elements, eg 114, 116, 118, 120, 122, of the transmitter 102, in order to maintain a stable frequency and phase relationship between the digitally-generated OFDM subcarriers and the RF carrier. This may be achieved, for example, by deriving the digital clock waveform from the output of the RF carrier oscillator 124, or vice versa, or by implementing appropriate phase-locking between the RF carrier oscillator 124 and a separate oscillator used to generate the digital clock waveform.

The two RF carrier components are combined with the corresponding I- and Q-signal components in combiners 130, 132. The combiners may be, for example, simple resistive power combiners, or multiplexing filters. Notably, the combiners 130, 132 of the preferred embodiments are not optical mixers, as no frequency shift of the baseband I and Q electrical signal components is desired.

Outputs 134, 136 of the two combiners 130, 132 consist of a baseband electrical signal component, and an RF carrier component having a central frequency $f_c$. Further details and characteristics of these signals are discussed below, with reference to FIG. 2.

The transmitter 102 further includes an optical source, in the form of laser 138, which has an output optical frequency $f_l$. The unmodulated laser output is input to a complex optical modulator 140, which has two electrical inputs to which the combined I and Q signals 134, 136 are applied. The complex optical modulator may be, for example, a dual-drive Mach-Zehnder modulator which is configured to modulate the input optical field so as to generate a modulated output having in-phase and quadrature components corresponding with the two electrical input waveforms.

Following transmission through the fibre link 104, the signal is detected at the receiver 110, using the photodiode 142. An amplifier 144 boosts the level of the received electrical signal to facilitate further processing.

The exemplary receiver 110 includes a mixer 146, the purpose of which is to extract the in-phase and quadrature component of the received electrical signal. These are applied, respectively, to the inputs of two analog-to-digital converters (ADCs) 148, 150. In a first processing stage 152, the digitised samples of the received waveforms are converted to a corresponding sequence of complex values, the cyclic prefix (CP) is removed, and the sequence is converted into a parallel format.

The resulting block of complex received signal values is applied to a Fast-Fourier Transform (FFT) processing block 154, the output of which is a corresponding block of frequency domain samples, each of which corresponds with one of the transmitted subcarriers.

Equalisation 156 is applied in order to compensate for at least the chromatic dispersion experienced by the signal during transmission through the fibre span 104. De-mapping units 158 then recover the original transmitted digital information from the equalised QAM symbol values. The recovered digital information is output via parallel port 160.

Further details of OFDM and related processing techniques for use in systems such as the exemplary embodiment 100 are disclosed in U.S. patent application Ser. No. 12/089,571 (also published as international patent application publication no. WO 2007/041799), which is incorporated herein in its entirety by reference.

An objective of the present invention is to improve the efficiency of utilisation of signal processing elements (eg 114, 116, 118, 120, 122) and available electrical bandwidth, when compared with prior art approaches. In particular, as will be discussed further below with reference to FIGS. 4 and 5, it is desirable to provide guard bands, in the form of unused portions of the optical and/or electrical frequency spectrum, in order to avoid or mitigate intermodulation interference that may occur between frequency components of the transmitted signal upon "square law" detection in a direct detection receiver, such as the exemplary receiver 110. Prior art methods and apparatus have generally utilised signal processing capacity, and/or electrical bandwidth, for this purpose. As will be appreciated, it would be desirable to apply these resources to the processing and transmission of desired information, in order to increase the transmission capacity available per unit of processing capacity, power consumption, electrical bandwidth, and/or other relevant finite resource.

Embodiments of the present invention address this objective by enabling the majority of elements in the main signal processing path of the transmitter 102 to operate at baseband, and to fully utilise the entire available baseband frequency range for the encoding and modulation of transmitted information. Unlike prior art methods and apparatus, it is not necessary to perform signal processing at higher frequencies in order to accommodate unused frequency components and/or frequency guard bands. Thus the signal processing elements, including DSPs, DACs, and other digital and analog elements, may be utilised to their maximum capacity. Additional benefits provided by embodiments of the invention include a reduction of power consumption and thermal load per bit of transmitted information, since energy is not expended generating signals which include non-information-bearing frequency components.

The manner in which the aforementioned advantages and benefits are achieved in the preferred embodiments of the invention is now described in greater detail, with reference to FIG. 2.

FIG. 2(*a*) and FIG. 2(*b*) illustrate schematically the spectra of the electrical signals at points 134, 136 respectively, which signals provide the inputs to the complex optical modulator 140. In particular, the sample rate of the corresponding digital signals is $f_s$, which determines a maximum frequency of the corresponding analog electrical signals output from the DACs 120, 122, which in turn determines the baseband bandwidth requirement of the electrical signals. In particular, if the signals have a predetermined baseband bandwidth requirement of B, the minimum sampling frequency $f_s$ is equal to 2B. Each one of the in-phase (I) and quadrature (Q) components of the information-bearing electrical signal is a real, baseband, signal having a (single-sided) bandwidth B. Since the information is distributed between the two signal components, the total useful information bandwidth is 2B. The OFDM transmitter 102 generates signals in which this bandwidth is occupied by a plurality of orthogonal subcarriers, each of which carries a corresponding portion of the overall information signal.

At the combiners 130, 132, RF carrier components having identical centre frequency $f_c$, but differing in phase by 90 degrees, are added to the respective I- and Q-signal components. The resulting combined I component has a (two-sided) spectrum 202, including the baseband I-signal component 204 and carrier tones 208*a* and 208*b*. The sampling frequency $f_s$ is also indicated 206 on the spectrum 202. Similarly, the combined Q component has a (two-sided) spectrum 212, which includes the baseband Q-signal component 214, and the phase-shifted carrier components 218*a*, 218*b*.

FIG. 2(*c*) illustrates the corresponding (single-sided) optical spectrum 222, which results from application of the combined I- and Q-signal and carrier components to the respective inputs of the complex optical modulator 140. The optical modulator 140 is preferably biased at its null point, which is desirable in order to maximise the linearity of the modulator relative to the information-bearing electrical signal. Notably, in some prior art techniques it is necessary to bias the optical modulator away from its null point, ie to apply a DC offset, in order to retain an optical carrier component in the modulator output. This approach, however, disadvantageously requires a reduction in modulation depth, which in turn reduces the overall power budget of the transmission system, as well as its robustness to chromatic dispersion.

As illustrated by the optical spectrum 222, in accordance with the preferred embodiment of the present invention the information-bearing optical sideband 224, corresponding with the electrical signal components 204, 214, is centred on the laser frequency $f_l$, which is also indicated 226 in FIG. 2(*c*). The optical carrier, $f_o$ 228, is derived from the RF carrier components 208*a*, 208*b*, 218*a*, 218*b*. The information-bearing subcarriers are substantially confined to the single optical sideband 224. Accordingly, direct detection of the signal having the optical spectrum 222 results in a direct conversion of the information-bearing sideband 224 into the electrical domain, as further described below with reference to FIG. 4.

It will be understood from the forgoing discussion that, in accordance with the embodiment 102, the combiners 130, 132 and complex optical modulator 140 together comprise means for modulating the optical source 138 with the I-signal, I-carrier, Q-signal and Q-carrier components so as to produce a modulated optical signal 222 comprising an optical carrier 228 corresponding with the RF carrier, and substantially only a single information-bearing optical sideband 224 in the optical frequency domain. This same result may be achieved through the use of alternative devices and arrangements. For example, a multi-electrode modulator may be used, having separate inputs and/or electrodes for each one of the I- and Q-carrier components, and the I- and Q-signal components, whereby the optical source is modulated with a suitable combination of the I- and Q-signal and carrier components.

In the particular example illustrated in FIG. 2, the RF carrier frequency $f_c$ is selected to be three times the baseband electrical signal bandwidth B. The resulting optical spectrum 222 thus includes a vacant frequency guard band 230, having a frequency width of 2B.

Figure 3:
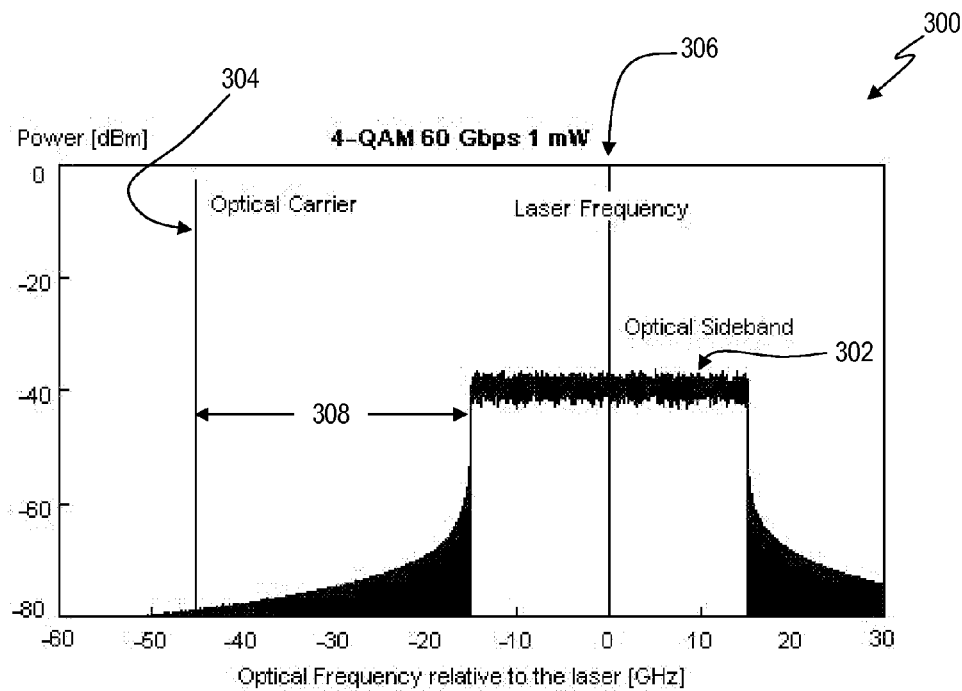
FIG. 3 shows a simulated transmitted optical spectrum generated according to an embodiment of the invention.
Figure 4:
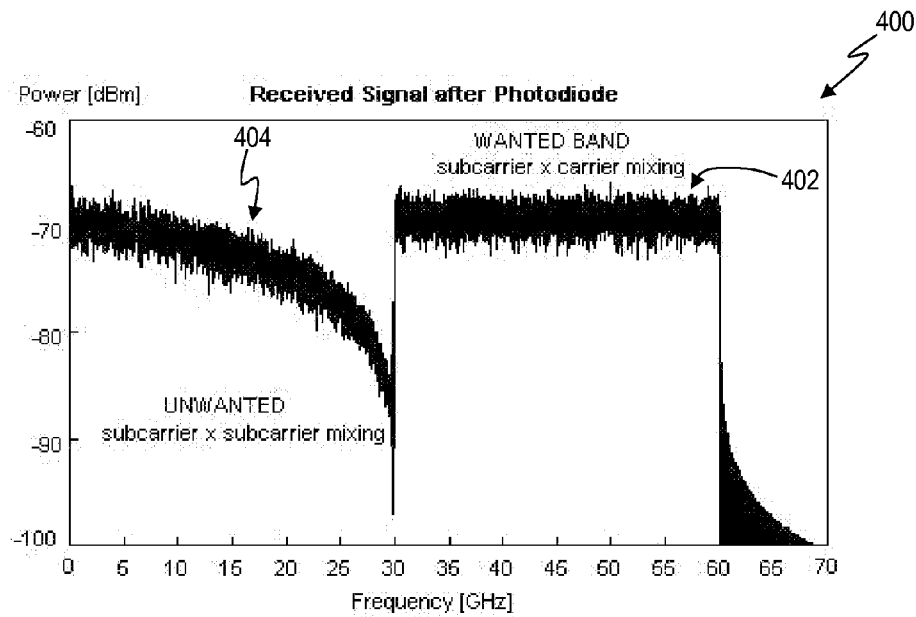
FIG. 4 shows a simulated received electrical spectrum corresponding with the transmitted optical spectrum of FIG. 3.

The operation of the exemplary system 100 has been verified through the use of computer simulations, the results of which are illustrated in FIGS. 3, 4 and 5. A 60 Gbps data rate was utilised in the simulations, with a block length of 1,024 bits. A 4-QAM symbol mapping was used, providing an overall symbol rate of 30 gigasymbols-per-second. The OFDM information signal thus includes 512 subcarriers, occupying a total bandwidth of 30 GHz, ie B=15 GHz.

In a first series of simulations, the results of which are illustrated in FIGS. 3 and 4, an RF carrier frequency $f_c$ of 45 GHz was used, ie $f_c$=3B, as illustrated schematically in FIG. 2.

FIG. 3 shows the simulated optical spectrum 300 at the output of the transmitter 102. The optical subcarrier band 302 is centred around the output frequency 306 of the laser 138. The optical carrier 304 is located 45 GHz from the centre of the subcarrier band 302, corresponding with the RF carrier frequency $f_c$. The subcarrier band 302 has a total bandwidth of 30 GHz as expected, and a guard band 308, also of 30 GHz, is provided.

FIG. 4 shows the simulated electrical spectrum 400 after detection by the photodiode 142. The spectrum clearly shows the desired information-bearing subcarrier band 402, as well as the undesired band 404 occupied by subcarrier x subcarrier mixing products generated in the course of "square law" detection by the photodiode 142. The unwanted interference products 404 may be filtered out either in the electrical domain, prior to analog-to-digital conversion in the ADCs 148, 150, or may be rejected in the course of digital processing of the received signal. The former approach may be preferable, in order to achieve maximum utilisation of the receiver signal processing capacity for processing and recovery of the desired information signal components 402.

In alternative embodiments, a lower RF carrier frequency may be employed, to enable the use of an optical modulator 140 having a lower electrical bandwidth. As will be appreciated, utilising a lower-frequency RF carrier results in a reduction of the size of the guard band 228. As a result, undesired subcarrier x subcarrier mixing products arising in the course of "square law" detection will coincide with a portion of the desired information-bearing subcarrier frequency band.

In order to minimise the degradation caused by interference from intermodulation mixing products, a carrier boost technique may be employed at the receiver, as described in the specification of International PCT application no. PCT/AU2008/001526, which is hereby incorporated herein in its entirety by reference. FIG. 5 illustrates the results of further simulations performed using a RF carrier frequency $f_c$ of only 22.5 GHz, resulting in a guard band of only 7.5 GHz.

Figure 5A:
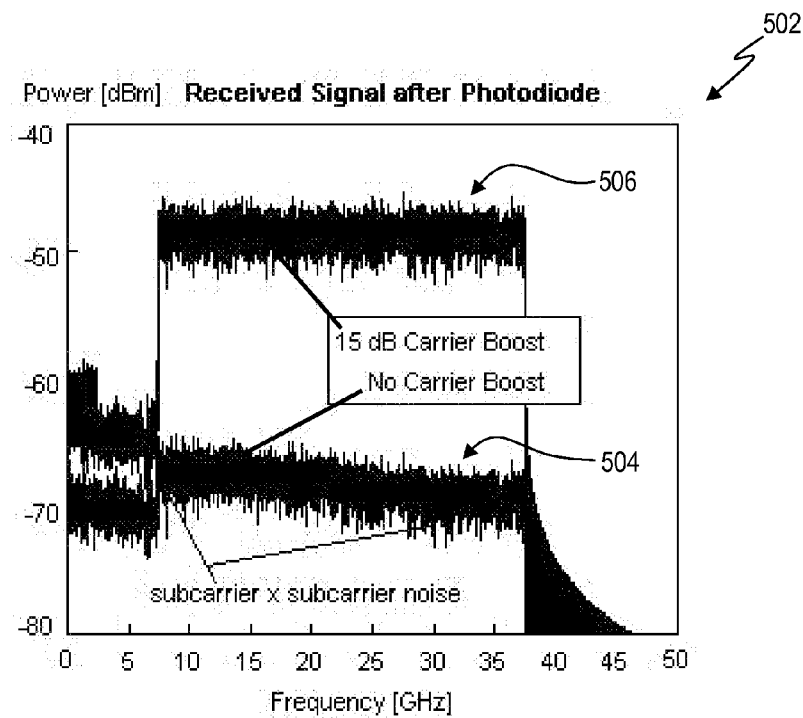
FIG. 5 shows a simulated received electrical spectrum and constellation pattern corresponding with an alternative embodiment of the invention which utilises a reduced RF carrier frequency.

The received electrical signal spectrum in the simulations, following the photodiode 142, is illustrated in FIG. 5(a). In particular, the spectrum 502 shows received signals corresponding with no carrier boost 504 and with a carrier boost of 15 dB relative to the signal band 506. Carrier boost results in a corresponding increase in the electrical power spectral density of the desired subcarrier signal band, with no corresponding relative increase in the unwanted intermodulation interference products. Accordingly, carrier boosting enables the impact of the unwanted interference products to be mitigated.

Figure 5B:
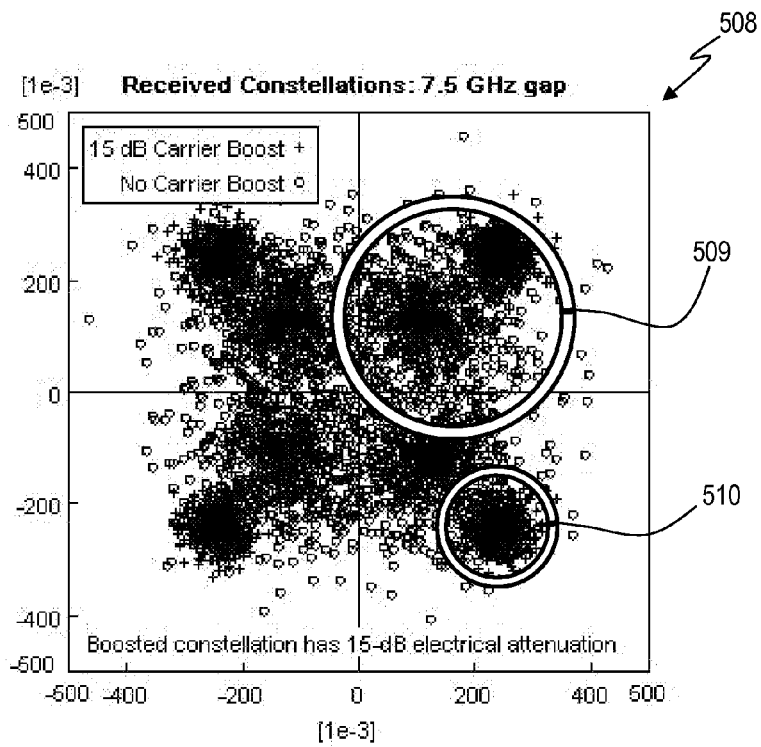

FIG. 5(b) shows the 4-QAM constellation patterns corresponding with the unboosted and boosted received signal spectra 502. In particular, the circular points in the constellation pattern 508 represent the recovered QAM symbols for the received signal without carrier boosting, which have become widely scattered, eg generally within the region 509, indicating a poor electrical signal quality and high bit error rate (BER). The cross points, which represent the recovered QAM symbols for the carrier-boosted signal, have formed into distinct clusters, eg within the region 510, corresponding with the 4-QAM symbols which are readily distinguishable indicating a good electrical signal quality, and high bit error rate (BER).

Figure 6:
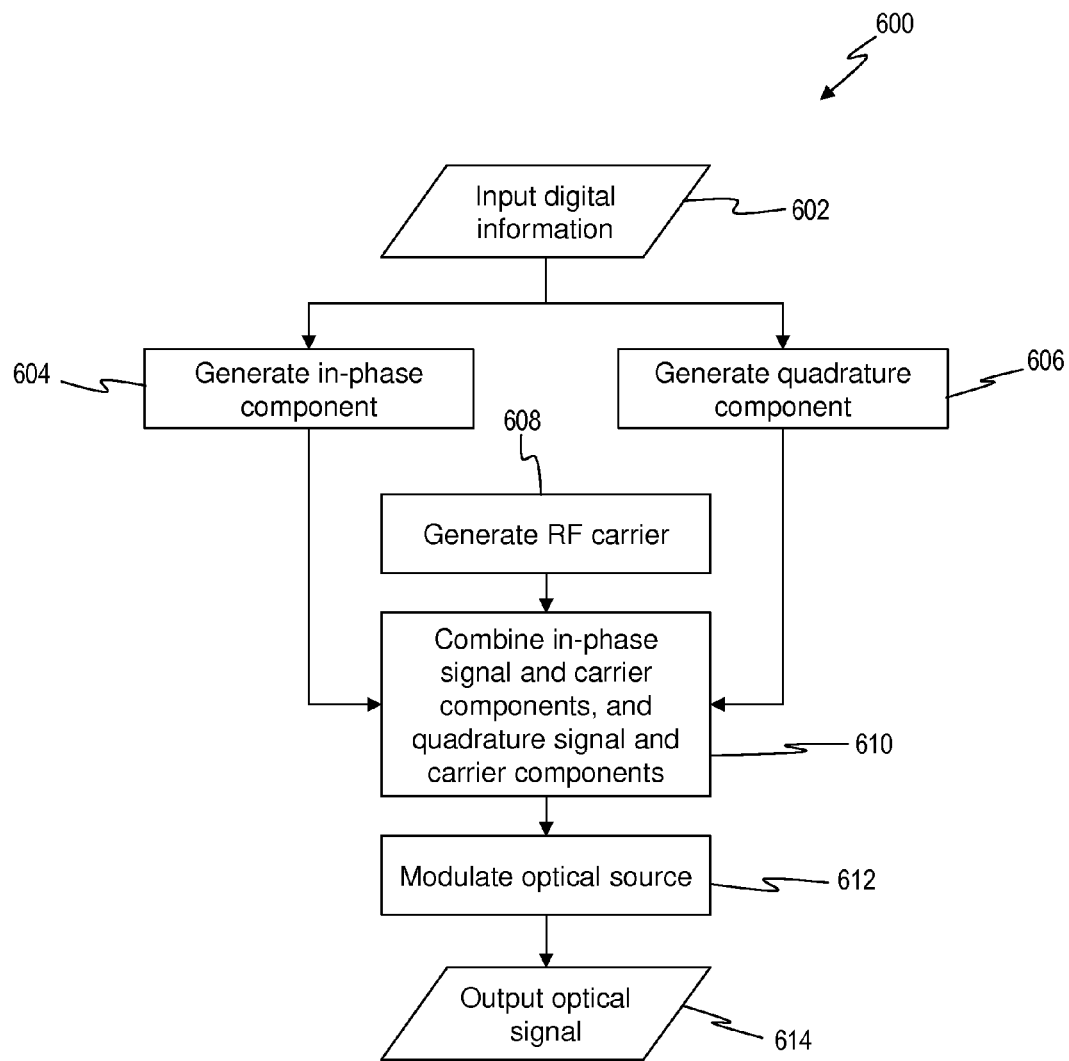
FIG. 6 is a flowchart illustrating a preferred method of generating an information-bearing optical signal according to embodiments of the invention.

FIG. 6 is a flowchart 600 which illustrates a preferred method for generating an information-bearing optical signal according to embodiments of the invention, such as the embodiment 100 described above with reference to FIG. 1. In accordance with this method 600, input digital information is received 602, which is processed at steps 604, 606 in order to generate corresponding in-phase (I) and quadrature (Q) components. In accordance with the embodiment 100 previously described with reference to FIG. 1, this processing is in accordance with OFDM methods, which produce a complex-valued signal including a plurality of closely-spaced frequency subcarriers, in which the real part represents the in-phase component, and the imaginary part the quadrature component. However the invention is not limited to OFDM signals since, for example, any desired signal may generally be represented analytically as a superposition of in-phase (ie real) and quadrature (ie imaginary) components.

At step 608 a suitable RF carrier is generated, which has a central frequency greater than the signal bandwidth requirement (B) of the information-bearing electrical signal components generated at steps 604, 606.

At step 610, the in-phase and quadrature signal components generated at steps 604, 606 are combined with corresponding components of the RF carrier generated at step 608, and these combined signals are used to modulate an optical source at step 612. In practical embodiments, the steps 610 and 612 may be separate, ie the in-phase signal and carrier components, and the quadrature signal and carrier components, may first be combined, and then applied to a suitable complex optical modulator in order to modulate an optical source, in the manner described above in relation to the embodiment 100 depicted in FIG. 1. In alternative embodiments, however, the steps 610 and 612 may be implemented using a single component, such as a multi-electrode optical modulator having separate inputs for the in-phase and quadrature signal components, and the RF carrier components, which are then effectively combined in the required manner within the modulator, in the course of modulating an optical carrier passing therethrough.

An output optical signal 614 is generated which comprises an optical carrier corresponding with the RF carrier, and substantially only a single information-bearing optical sideband in an optical frequency domain, which corresponds with the information-bearing electrical signals generated at steps 604, 606.

It will be appreciated from the foregoing description that many variations of the present invention are possible, and that the invention is not to be limited to the particular embodiments described herein. Rather, the scope of the invention is as defined by the claims appended hereto.

The invention claimed is:

1. A method of generating an information-bearing optical signal, including the steps of:
   generating an information-bearing baseband electrical signal comprising an in-phase (I) component and a quadrature (Q) component, each said component having a predetermined single-sided baseband bandwidth requirement (B);
   combining said baseband I- and Q-signal components with corresponding I and Q components of a radio frequency (RF) carrier, said carrier having a central frequency greater than said bandwidth requirement (B); and
   modulating an optical source having an optical frequency ($f_1$) with the combined baseband I-signal and RF I-carrier components and baseband Q-signal and RF Q-carrier components so as to produce a modulated optical signal comprising a single information-bearing optical sideband at the optical frequency $f_1$, corresponding with said information-bearing electrical signal components, and an optical carrier offset from the optical frequency ($f_1$), corresponding with said RF carrier components.

2. The method of claim 1 wherein the step of generating the information-bearing electrical signal comprises producing real-valued digital signals corresponding with the I- and Q-signal components, and converting the digital signals into corresponding analog electrical waveforms.

3. The method of claim 1 wherein the RF carrier has a central frequency that is greater than or equal to 3B.

4. The method of claim 1 wherein the step of modulating the optical source includes applying the combined I- and Q-signal and carrier components to an optical modulator which is configured to modulate the optical source so as to produce the modulated optical signal comprising the optical carrier and the information-bearing optical sideband.

5. The method of claim 4 wherein the modulator is a complex optical modulator having an optical input port, to which an unmodulated optical source is applied and at least two electrical input ports to which said combined I- and Q-signal and carrier components are respectively applied, the modulator further having an optical output at which the modulated optical signal is provided.

6. The method of claim 1 wherein the information bearing electrical signal is generated in accordance with an orthogonal frequency division multiplexing method.

7. An optical transmitter which includes:
   an electrical signal generator configured to generate an information-bearing baseband electrical signal comprising an in-phase (I) component and a quadrature (Q) component, each said component having a predetermined single-sided baseband bandwidth requirement (B);
   an electrical carrier generator configured to generate a radio frequency (RF) carrier having a central frequency greater than said signal bandwidth requirement (B);
   electrical combiners for combining said baseband I- and Q-signal components with corresponding I and Q components of the RF carrier;
   an optical source having an optical frequency ($f_1$); and
   an optical modulator configured to modulate the optical source so as to produce a modulated optical signal comprising a single information-bearing optical sideband at the optical frequency ($f_1$), corresponding with said information-bearing electrical signal components, and an optical carrier offset from the optical frequency ($f_1$), corresponding with said RF carrier components.

8. The optical transmitter of claim 7 wherein the carrier generator includes an RF oscillator.

9. The optical transmitter of claim 8 further including a power divider for dividing the output of the single RF carrier source into two components, and at least one time delay or phase shifter for applying a phase shift of 90 degrees to one of said two components relative to the other one of said two components.

10. The optical transmitter of claim 7 wherein the electrical signal generator includes digital processing elements configured to produce real valued digital signals corresponding with the I- and Q-signal components, and digital-to-analog converters for converting said digital signals into corresponding analog electrical waveforms.

11. The optical transmitter of claim 7 wherein the electrical combiners are simple resistive power combiners.

12. The optical transmitter of claim 7 wherein the electrical combiners include multiplexing filters.

13. The optical transmitter of claim 7 wherein the electrical signal generator includes digital processing elements arranged to process complex valued signal samples having corresponding real and imaginary components, and further including first and second digital-to-analog converters,
   wherein said real components are applied to the first digital-to-analog converter to produce the I-signal component, and the imaginary components are applied to the second digital-to-analog converter to produce the Q-signal component.

14. The optical transmitter of claim 7 wherein the optical modulator is a complex optical modulator having an optical input port, to which the optical source is applied, and at least two electrical input ports to which the combined I- and Q-signal and carrier components are respectively applied, the modulator further having an optical output at which the modulated optical signal is provided.

15. An optical transmitter which includes:
   means for generating an information-bearing baseband electrical signal comprising an in-phase (I) component and a quadrature (Q) component, each said component having a predetermined single-sided baseband bandwidth requirement (B);
   means for generating I- and Q-carrier components of a radio frequency (RF) carrier having a central frequency greater than said signal bandwidth requirement (B);
   an optical source having an optical frequency ($f_1$); and
   means for modulating the optical source with said I-signal, I-carrier, Q-signal and Q-carrier components so as to produce a modulated optical signal comprising a single information-bearing optical sideband at the optical frequency ($f_1$), corresponding with said information-bearing electrical signal components, and an optical carrier offset from the optical frequency ($f_1$), corresponding with said RF carrier components.

* * * * *